United States Patent
Ruesch

[11] 3,768,293
[45] Oct. 30, 1973

[54] APPARATUS FOR CONDITIONING THE EDGES OF METAL STRIP MATERIAL

[76] Inventor: Alan D. Ruesch, 904 Seegwun, Mount Prospect, Ill. 60056

[22] Filed: Nov. 11, 1971

[21] Appl. No.: 197,859

[52] U.S. Cl. .................. 72/203, 72/234, 90/24 F, 29/33 Q, 29/33 S
[51] Int. Cl. .................................................. B21b 15/00
[58] Field of Search .................. 29/33 S, 33 Q, 17; 90/24 F; 72/199, 234, 341, 203

[56] References Cited
UNITED STATES PATENTS
| | | | |
|---|---|---|---|
| 3,336,778 | 8/1967 | Follrath | 72/203 |
| 3,172,331 | 3/1965 | Nole et al. | 90/24 F |
| 2,179,461 | 11/1939 | Yoder | 72/203 |

Primary Examiner—Francis S. Husar
Attorney—Guy A. Greenawalt

[57] ABSTRACT

An apparatus for conditioning the edges of metal strip material which is delivered from a web slitting apparatus or other source wherein grooved rollers are arranged in pairs for receiving one or more strips of the material with the edges along opposite sides of the strips traveling in oppositely disposed, transversely aligned grooves which remove any burrs resulting from the slitting of the material after which the deburred strips are drawn between pairs of oppositely disposed cutter blades having aligned edge cutting formations operative on each side of the strips and finally the strips are passed between pairs of finishing rollers having aligned grooves in which the strip edges are received and which apply pressure sufficient to round the cut edges and smooth the same without appreciable distortion of the strip body.

16 Claims, 14 Drawing Figures

PATENTED OCT 30 1973　　　　　　　　　　3,768,293

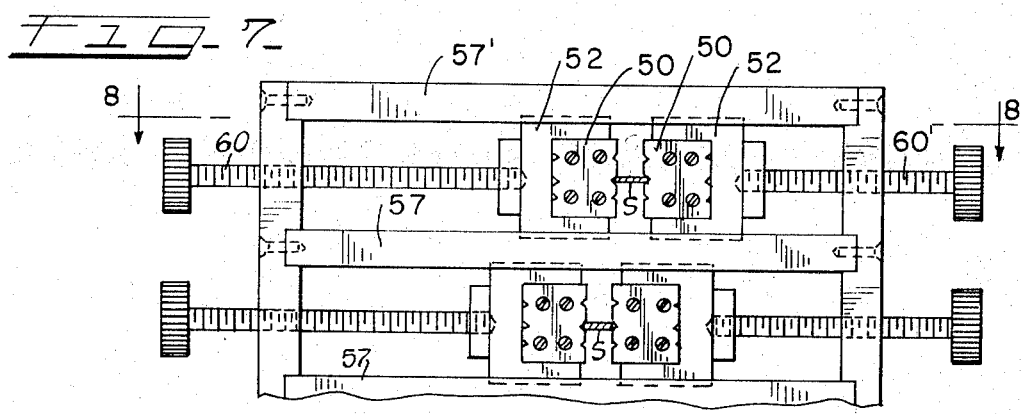
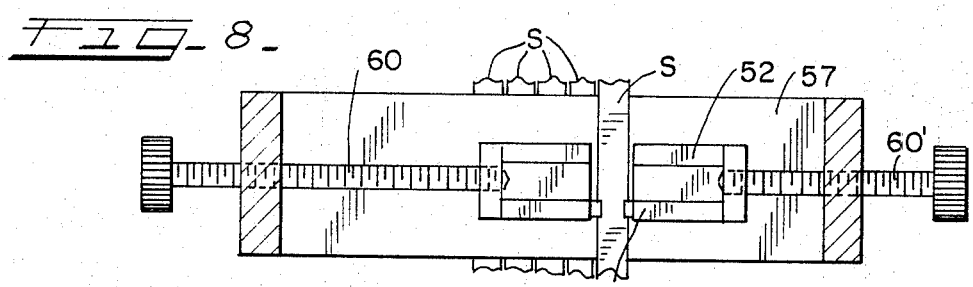
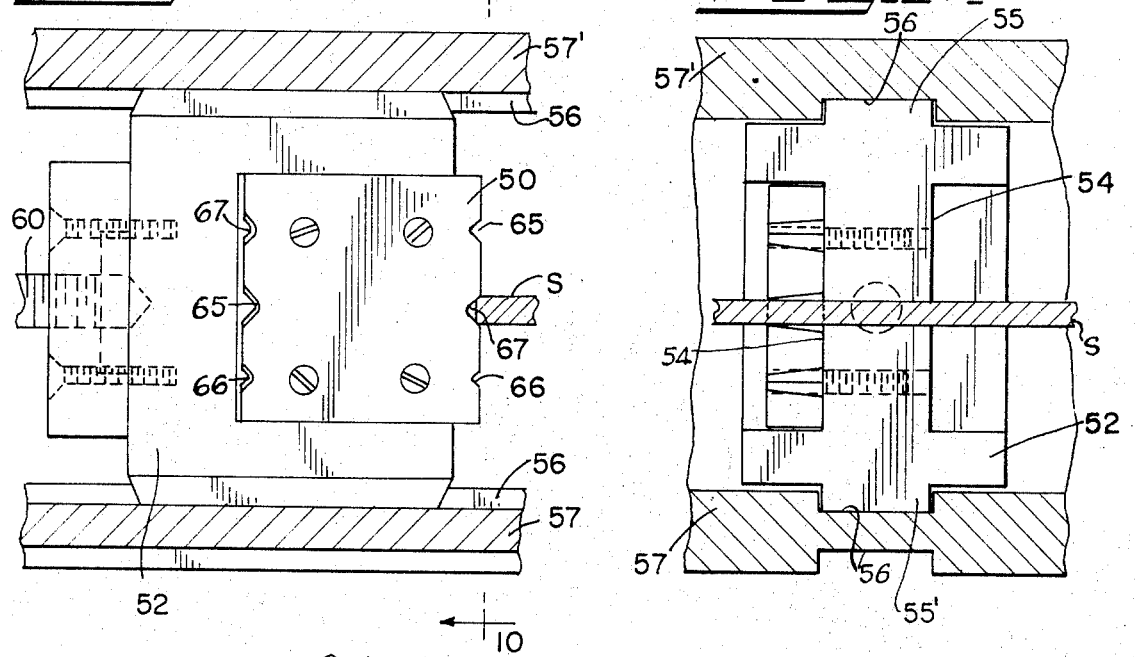
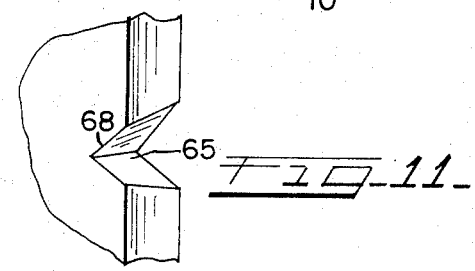

APPARATUS FOR CONDITIONING THE EDGES OF METAL STRIP MATERIAL

This invention relates to the working of metal strip material and is more particularly concerned with improvements in apparatus for treating the side edges of cut strips so as to smooth the same.

In a number of industries metal strips of various thickness and width are employed in the fabrication of products or apparatus of various kinds. For example, in the electrical industry metal strip stock is frequently employed in place of conventional round wire in the manufacture of coils and other electrical equipment. Generally, the strip stock is derived by slitting a wide web into a multiplicity of strands. When the metal strips or strands are obtained in this manner, the slitting operation results in burrs and sharp edges which can cause injury during handling of the strips and consequently is quite objectionable. Various efforts have been made to eliminate the burrs and sharp edges resulting from the slitting operation. Apparatus for treating this type strip material has been devised, much of which has not proven acceptable, generally because it has not resulted in the desired smoothness or successful operation has required the application of excessive pressure on the strip edges resulting in a "dog bone" cross section which for many purposes is objectionable.

It is a general object, therefore, of the present invention to provide an apparatus for operating on the edges of metal strips so as to round the same without appreciable distortion of the body of the strip.

It is a more specific object of the invention to provide an apparatus for conditioning the side edges of metal strip material which has been cut from a wider web, or the like, resulting in a raw edge, which apparatus will accept a multiplicity of strips and smooth the side edges so as to lessen the risk of injury in subsequent handling of the strip material.

It is a still more specific object of the invention to provide an apparatus for treating the side edges of metal strip material so as to round the same wherein provision is made for passing the strip between rollers having aligned grooves operative to remove any burr thereon and thereafter advancing the strip past cutting elements which remove some of the edge material and finally advancing the strip between finishing rollers having aligned grooves which are spaced to apply sufficient pressure to round the cut edges of the strip without distorting to any appreciable degree the body of the strip.

Another object of the invention is to provide an apparatus for treating a multiplicity of cut strips of metal which comprises co-operating rollers and cutting blades arranged in staggered relation in a frame so as to handle a plurality of strips cut from a wider web and drawn through the apparatus.

A further object of the invention is to provide a metal strip treating apparatus which includes a plurality of pairs of spaced rollers having peripheral grooves arranged in oppositely disposed relation in which the side edges of the strips are received, with the rollers adjusted to apply sufficient pressure to first remove the burrs from the strip edges and subsequently work the edge material so as to smooth the same without objectionable distortion of the strip body.

Still another object of the invention is to provide a strip edge working or smoothing apparatus which includes oppositely disposed edge cutters in the form of plates with knife forming slots in opposed edges thereof which form cutting elements for removing some of the material from the edges of the strips.

These and other objects and advantages of the invention will be apparent from a consideration of the strip edge conditioning apparatus which is shown by way of illustration in the accompanying drawings wherein:

FIG. 7 is a partial cross section, to an enlarged scale, taken on the line 7-7 of FIG. 1;

FIG. 8 is a cross section taken on the line 8—8 of FIG. 7;

FIG. 9 is a fragmentary view, to an enlarged scale, showing one of the cutting blades which are shown in FIG. 7;

FIG. 10 is a fragmentary cross sectional view taken on the line 10—10 of FIG. 9;

FIG. 11 is a fragmentary perspective view showing one of the cutter plate details.

Figure 1:
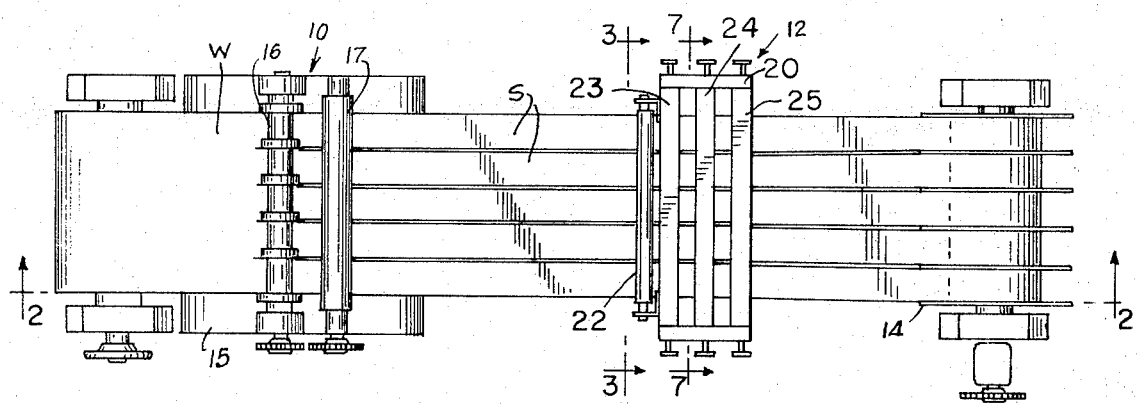
FIG. 1 is a plan view of an apparatus for slitting a web of relatively thin sheet metal, drawn from a coil thereof, into a plurality of relatively narrow strips or strands and for conditioning the edges of the strips so as to remove burrs resulting from the slitting operation and thereafter removing portions of the edge material and smoothing the edge surfaces.
Figure 2:
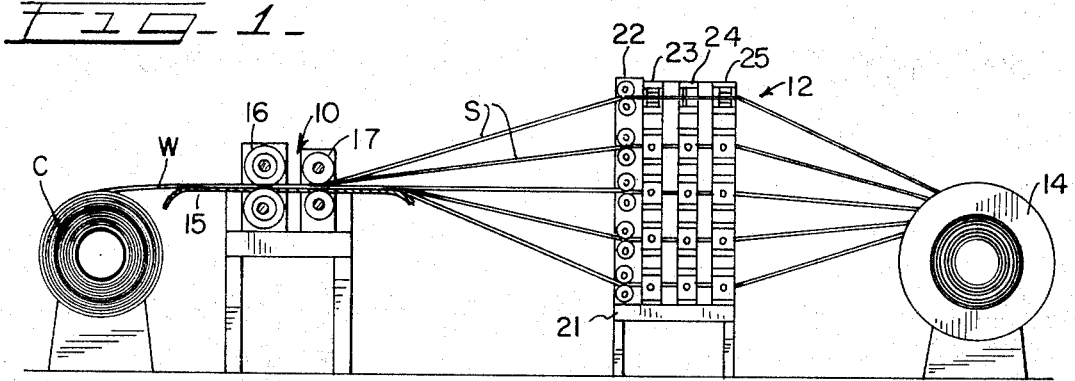
FIG. 2 is a sectional view of the apparatus shown in FIG. 1, the view being taken on the line 2—2 of FIG. 1.

Referring to FIGS. 1 and 2 of the drawings, there is illustrated a typical metal strip slitting and edge conditioning apparatus which incorporates therein the invention. In the arrangement shown a web W of substantial width is drawn from a supply coil C thereof and advanced through a slitting mechanism 10. From the slitter device 10 the strips S are fed to an edge conditioning mechanism 12 and the finished strips are then delivered to a windup reel 14. The separate operating mechanisms are mounted on stands or other suitable supporting structure. The slitting mechanism 10 is of conventional construction and may include a table 15 for supporting the web W and co-operating slitting blades 16 or discs with take-off rollers 17. The rollers 17 may be power driven to advance the strip material but preferably the windup reel 14 is powered so as to draw the material through the slitter 10 and the edge conditioning apparatus 12.

The edge conditioning apparatus 12 comprises a frame structure 20 of generally rectangular shape which is supported in upstanding relation on a table structure 21. The frame 20 supports a guide roller assembly 22 at the entrance side of the apparatus, a burr removing assembly 23, a cutting plate assembly 24 and an edge rolling or edge working assembly 25, the latter being at the discharge side of the support frame. The separate strip treating assemblies 23, 24 and 25 are disposed in vertical planes and longitudinally spaced on the frame 20 in the direction of travel of the strip material.

Figure 3:
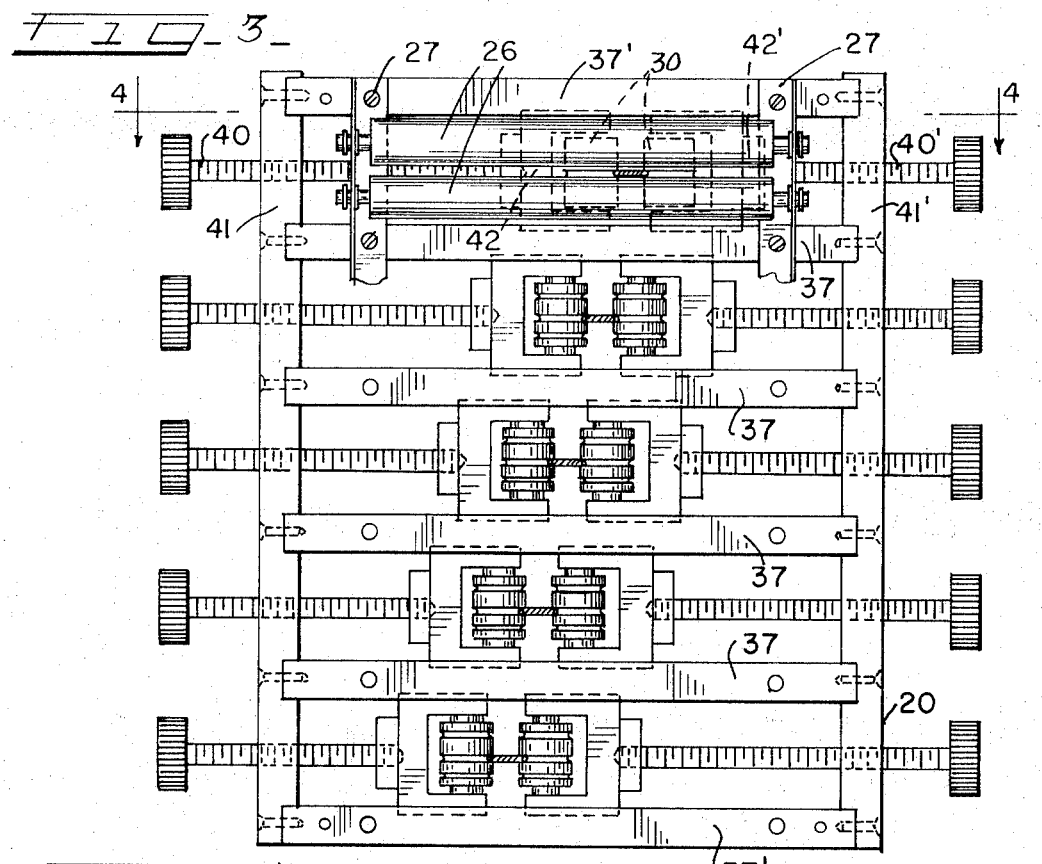
FIG. 3 is a view taken on the line 3—3 of FIG. 1, to an enlarged scale, and with portions broken away, which shows the entrance side or end of the strip edge conditioning apparatus.

The strip guide assembly 22 (FIGS. 2 and 3) comprises vertically spaced pairs of guide rollers 26 mounted on supporting side rails 27 which are removably mounted on the entrance face of the edge conditioning frame 20. Pairs of guide rollers 26 may be mounted on a single frame or side rail arrangement, or separate mounting means may be provided for each pair of the rollers 26 with provision for adjusting the same laterally of the supporting frame 20. The guide roller assembly 22 or the separate roller assemblies are arranged on the entrance face of the edge treating apparatus 12 so that the pairs of guide rollers 26 are in vertically spaced or stacked relation corresponding to the like arrangement of the strip treating devices in the assemblies 23, 24 and 25. The guide rollers 26 are arranged so that the strips S coming from the forwarding rollers 17 are vertically spaced as they enter the edge treating apparatus 12, and there is no edge interference, one with another, as the strips S are advanced through the apparatus.

Figure 5:
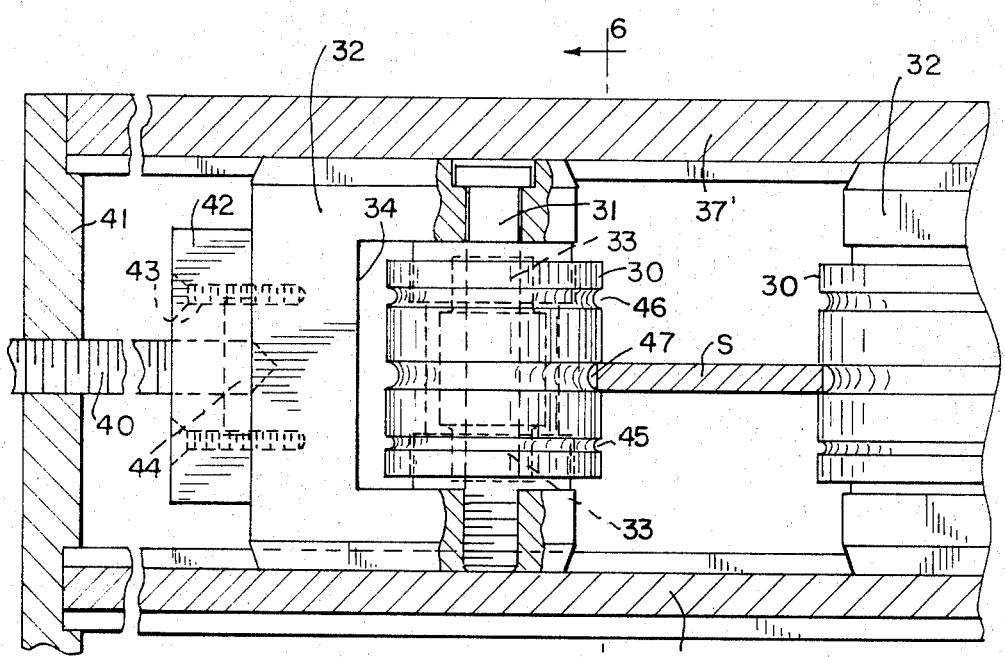
FIG. 5 is a fragmentary, cross sectional view, to an enlarged scale and with portions broken away, the view showing a pair of the burr removing rollers at the entrance end of the machine.
Figure 4:
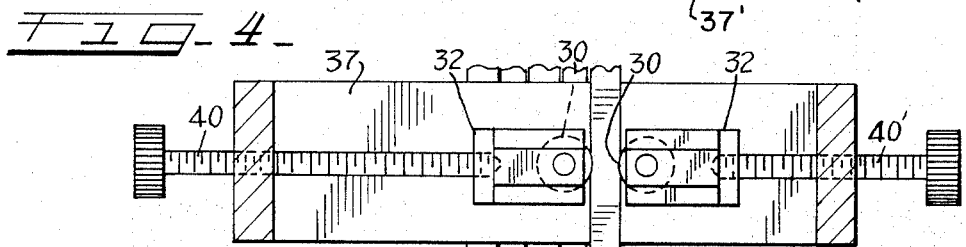
FIG. 4 is a cross sectional view taken on the line 4—4 of FIG. 3.
Figure 6:
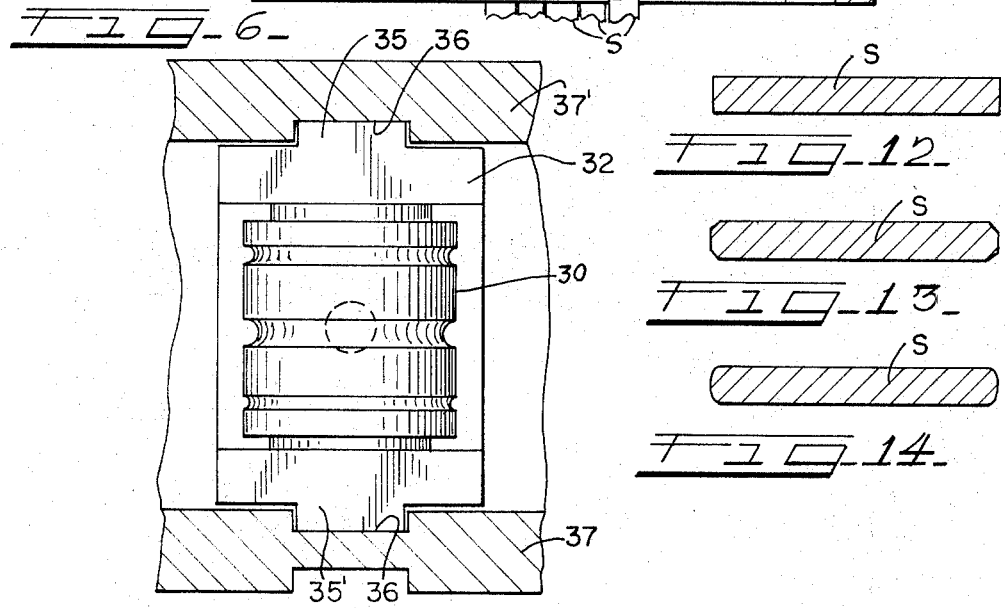
FIG. 6 is a cross sectional view taken on the line 6—6 of FIG. 5.

The burr removing mechanism 23 (FIGS. 4, 5 and 6) comprises a series of vertically spaced pairs of rollers 30 which are of identical construction and which are each suitably mounted for rotation on a pin 31, the latter being mounted in a carriage forming holder 32 of generally C or U shape. The rollers 30 of each pair thereof are each mounted by means of end bearings, indicated at 33, for free rotation on the supporting pin 31, the latter being fixed so as to extend across the recess 34 in the holder 32. The roller holder 32 has top and bottom ribs 35 and 35' which are received in guideways 36 in vertically spaced cross frame members or bars 37 and 37' as shown in FIGS. 5 and 6. The top bar 37' having the guideway 36 in its bottom face and the bottom bar 37 which is an intermediate cross bar in the frame structure 20 having a guideway 36 in the top face with a like guideway in the bottom face for receiving a roller carriage or holder 32 of the next lower pair of rollers 30. The roller holders or carriages 32 for each pair of rollers are arranged so that the recesses 34 therein face toward each other. The roller holders 32 are mounted in an identical manner for sliding adjustment in the guideways 36, the latter extending in the cross bars 37 and 37' so as to permit the desired lateral adjustment of the rollers 30 of each pair thereof relative to each other for accommodating strips of different width and relative to the next adjacent pair of rollers which will be adjusted to accommodate the next strip according to the width of the latter and its transverse position. The roller carriages 32 of each pair are adjusted laterally of the support frame 20 by means of screws 40 and 40' which have screw threaded connection with side frame members 41 and 41' and which are connected to the holders 32 by brackets 42. The brackets 42 are U-shaped and bolted or otherwise secured to the outside faces of the carriage members 32 with the end of the bolt extending through a bore 43 in the bracket and having a head forming nut 44 which retains the same in rotatable connection with the bracket.

Figure 12:
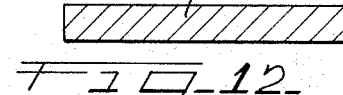
FIGS. 12, 13 and 14 are cross sectional views showin the condition of the edges of the strip material following the successive operations thereon resulting from passing the strip through the edge conditioning apparatus.

The rollers 30 are each provided with three axially spaced, peripheral grooves 45, 46 and 47 (FIGS. 5 and 6) which are of different size to accommodate different thicknesses of strip material. Each of the grooves 45, 46 and 47 is of circular or semi-circular cross section with the larger size groove being in the center relative to the axial dimension of the roller. The grooves 45, 46 and 47 are of a size, relative to the thickness of the strip material, to permit the rollers to be adjusted so that the strip edges are received in the grooves and bear at the top and bottom on the curved surfaces thereof. The rollers of each pair are adjusted relative to each other so that there is relatively light pressure on the strip edges, sufficient to knock off any burr which remains from the slitting operation. This leaves the strip edges generally in the condition shown in FIG. 12 after passing between a pair of properly adjusted rollers 30.

The strips advance from the burr removing assembly 23 to a cutter assembly 24 (FIGS. 7 to 11) which comprises pairs of identical cutter plates 50 mounted on holders or carriages 52. The holders 52 correspond to and are mounted in the same manner as the roller holders or carriages 32. Each pair of cutter plates 50 is aligned, longitudinally of the path of travel of the strips, with a pair of burr removing rollers 30 at the entrance side of the apparatus. Each of the cutter plate carriages 52 is recessed on opposite faces as indicated at 54 and 54' in FIG. 10 to receive a cutter plate 50, the latter being mounted therein by means of bolts or other suitable fastening means. The recesses 54 and 54' are provided on opposite faces so as to enable the carriage members 52 to be used in either right hand or left hand position as shown in FIG. 7. The cutter plate holders or carriages have top and bottom ribs 55 and 55' and are mounted for sliding adjustment in guide slots 56 in cross bars 57 and 57' of the support frame 20, in the same manner as the roller carriages 32, with adjusting bolts 60 and 60' corresponding to bolts 40 and 40'.

The plates 50 which are preferably of tungsten carbide are each provided on the opposite vertical edges, as viewed in FIGS. 7 and 9, with V-shaped slots or notches 65, 66 and 67 which are adapted to be aligned with the grooves 45, 46 and 47 in the burr removing rollers 30. Each of the slots 65, 66 and 67 is tapered toward the center of the blade and in the direction of travel of the strip material, as shown in FIG. 11, so as to provide a cutting edge 68 at the entrance side of the plate and clearance to prevent binding at the exit side thereof. The plates 50 are notched in an identical manner on opposite vertical edges so that they may be used as either rights or lefts and also the edges may be switched in use when one edge becomes dulled. The notches 65, 66 and 67 are of a size and arranged in the same relation as the roller grooves 45, 46 and 47 so as to accommodate strips of material of different thickness. The notches in each plate 50 are aligned with the grooves in the associated burr removing roller.

The edge finishing or working assembly 25 which is mounted at the exit side of the frame 20 may be a duplicate of the burr-removing assembly 23 with pairs of grooved rollers of the same construction as rollers 30 mounted in holders or carriages of the same construction as the holders 32, the carriages being slidably received in frame cross bars of the same construction as cross bars 37 and 37' and having associated adjusting screws of the same character as adjusting screws 40 and 40'. The finishing rollers have circumferential grooves, in which the strip edges are received, of the same configuration and axial disposition as the grooves 45, 46 and 47 in rollers 30. The assembly 25 is mounted in a vertical plane spaced from the cutter assembly 24 with the pairs of rollers aligned with the pairs of cutter blades 50 which are disposed at the same elevation. The adjusting screws for the rollers in finishing roller assembly are operative to adjust each pair of the rollers toward and from each other and to align each pair thereof in the direction of strip travel with a pair of the cutter blades 50 and a pair of burr-removing rollers 30 so that the metal strips travel in a substantially straight line across the frame 20.

Figure 13:
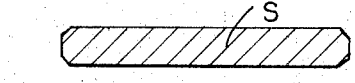
Figure 14:
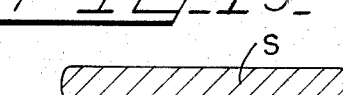

In the use of the apparatus in the slitting and conditioning set up illustrated the pairs of rollers 30 of the burr-removing assembly 23 are adjusted so as to receive the edges of the strips in the proper size grooves with sufficient pressure to cause any burr on the strip edges to be pinched or knocked off. The plates of each pair of cutter plates 50 are adjusted so that they are spaced the proper distance to shear, or chip or cut off a relatively small amount of the metal at the top and bottom of the faces of the strip edges leaving the edges as shown in FIG. 13. The finishing rollers in the assembly 23 are adjusted so that each strip is received in the proper size groove and the rollers of each pair thereof are adjusted or spaced so that sufficient pressure is applied to opposite edges of the strip to round the cut edges and smooth the surface thereof without distorting the body of the strip so as to produce a "dog bone" effect. The removal of the edge material by the cutters 50 enables working of the metal with the finishing rollers of each pair spaced so as to provide adequate but not excessive pressure on the strip, thereby producing an edge as shown in FIG. 14 with the desired smoothness.

I claim:

1. An apparatus for conditioning the edges of metal strip material which is delivered from a web slitting apparatus or other source which apparatus comprises de-burring grooved rollers arranged in pairs for receiving one or more strips of the material with the edges along opposite sides of the strip traveling in oppositely disposed, transversely aligned grooves in said de-burring grooved rollers so as to remove any burrs resulting from the slitting of the material, pairs of oppositely disposed cutter blades having aligned edge cutting formations between which the strip material is drawn, which edge cutting formations are operative on each side of the strip for removing part of the material, and pairs of finishing rollers having aligned grooves in which the strip edges are received and which are spaced so as to apply pressure sufficient to round the cut edges and smooth the same without appreciable distortion of the strip body.

2. An apparatus as set forth in claim 1 wherein said de-burring grooved rollers and said finishing rollers are substantially duplicates.

3. An apparatus as set forth in claim 1 wherein each of said grooved rollers has a plurality of axially spaced circumferential grooves of different cross sectional dimensions for accommodating strip material of different thickness.

4. An apparatus as set forth in claim 1 wherein each of said grooved rollers has a plurality of axially spaced circumferential grooves which are of a generally circular cross section so as to provide curved surfaces for engaging portions of the edge faces of the strip material.

5. An apparatus as set forth in claim 1 wherein each of said grooved rollers is mounted on a vertical axis in a carriage forming member and wherein said carriage forming member is slidably supported in said frame for adjustment laterally of the path of advance of the strip material so as to permit the rollers, each pair thereof to be adjusted toward and from each other.

6. An apparatus for conditioning the edges of metal strip material which is delivered from a web slitting apparatus or other source which apparatus comprises de-burring rollers having axially spaced, peripheral grooves, said rollers being arranged in pairs on parallel axes for receiving strips of the material with the edges along opposite sides of the strip material traveling in oppositely disposed, transversely aligned grooves, the grooves in said de-burring rollers being operative to remove any burrs resulting from the slitting of the material, pairs of cutter blades having opposed edge cutting formations between which the strip material is drawn, which edge cutting formations are operative on each side edge of the strip for removing portions of the material, and pairs of finishing rollers mounted on parallel axes and having aligned, axially spaced, peripheral grooves in which the strip edges are received, which finishing rollers are spaced so as to apply pressure sufficient to work the cut edges and smooth the same without appreciable distortion of the strip body.

7. An apparatus as set forth in claim 6 wherein said cutter blades each comprise a generally rectangular body portion with oppositely disposed side edges notched at spaced intervals to provide a series of edge cutting formations.

8. An apparatus as set forth in claim 6 wherein said cutter blades each comprise a plate member having a side edge provided with one or more outwardly opening notches forming a cutting edge past which the side edge of the strip material is drawn and said cutting edge having a generally V-shaped configuration.

9. An apparatus as set forth in claim 8 wherein each said notch is tapered so as to increase in cross sectional dimension in the direction of advance of the strip material and thereby provide clearance for the passage of said strip material with minimum binding.

10. An apparatus as set forth in claim 6 wherein said cutter blades each comprise a generally rectangular plate member having oppositely disposed edges in each of which there are spaced notches providing a plurality of cutting edges, the notches in one plate edge being aligned with the notches in the opposite plate edge so that said oppositely disposed edges of said plate member may be interchanged for cutting engagement with the side edges of the strip material.

11. An apparatus as set forth in claim 6 wherein said cutter blades are each in the form of a generally rectangular plate member with oppositely disposed edges in which there is one or more edge cutting formations for engaging an edge of the strip material at the top and bottom of the edge surface of said strip material.

12. An apparatus as set forth in claim 6 wherein said cutter blades of each pair thereof are mounted in holder members which holder members are mounted for adjustment toward and from each other and said cutter blades are mounted in said holders so as to be positioned on opposite sides of the path of advance of the strip material.

13. An apparatus as set forth in claim 12 wherein said cutter blades are mounted in said holder members so as to be disposed in a plane generally normal to the path of advance of the strip material with a pair of said edge cutting formations positioned to cut material from the top and bottom portions of the side edges of the strip material.

14. An apparatus as set forth in claim 12 wherein said holder members are slidably mounted in guideways provided in cross frame members which support said apparatus and screw means is provided for adjusting the position of each holder member relative to the associated holder member.

15. An apparatus for conditioning the side edges of metal strip material so as to remove any burrs thereon resulting from the cutting of the strip material and to smooth said side edges, which apparatus comprises an upright frame structure having mounted thereon in successive, spaced, generally parallel planes, means for engaging the opposite edges of the strip material with sufficient pressure to break off any burrs, means to cut away portions of the strip material at the top and bottom margins of the side edge faces and means to engage the side edge face portions where the material has been cut away with sufficient pressure to work the material so as to provide a smooth surface, said means to remove burrs and said means to work the material so as to provide a smooth surface comprising separate pairs of rollers mounted for rotation on spaced vertical axes and having oppositely disposed peripheral grooves in which the side edge portions of the strip material are received, said rollers being mounted for adjustment toward and from each other so as to accommodate strip material of different widths and said means to cut away portions of the strip material comprises a pair of cutting members in the form of rectangular plates mounted in adjustable holders with the plates having oppositely disposed edges in which there are aligned generally V-shaped, outwardly opening notches forming cutting edges between which the strip material is advanced, with the plate holders adjusted to engage the side edges of the strip material with the cutting edges so as to cut away portions of the strip material.

16. An apparatus as set forth in claim 15 wherein said rollers have axially spaced grooves of different size which are adapted to be aligned so as to accommodate strip material of different thickness.

* * * * *